Sept. 22, 1953  J. H. BALDWIN  2,653,179
PRIMARY BATTERY AND METHOD OF MAKING THE SAME
Filed July 26, 1951

INVENTOR.
JOHN H. BALDWIN
BY Harry M. Saragovitz
Attorney

Patented Sept. 22, 1953

2,653,179

UNITED STATES PATENT OFFICE 2,653,179

PRIMARY BATTERY AND METHOD OF MAKING THE SAME

John H. Baldwin, Joplin, Mo.

Application July 26, 1951, Serial No. 238,737

5 Claims. (Cl. 136—24)

1

This invention relates to primary batteries utilizing the electrochemical system cadmium-acid-lead peroxide and more particularly to methods of making sponge cadmium electrodes for such batteries.

Cadmium-lead peroxide batteries have attained considerable attention as special purpose batteries, particularly as "one-shot" batteries for meteorological equipment, since they appear to show the necessary discharge characteristics at very low temperatures and high current drains. Previous methods of making a pasted sponge cadmium plate, whose apparent surface area is much less than the area of the exposed active sponge cadmium, have involved the preparation of sponge cadmium made by introduction of zinc pellets into a cadmium solution, whereby the zinc displaces the cadmium from its solution. The spongy cadmium thus obtained in bulk is, however, difficult to charge properly into the grid of the electrode without impairing the original spongy character of the cadmium as obtained by displacement reactions.

It is an object of the invention to improve the methods of making sponge cadmium electrodes in such a way as to retain the original spongy character of the cadmium obtained by displacement reactions. This and other objects of the invention are achieved by using the known method of displacing cadmium from a cadmium salt solution with the aid of a suitable metal, but effecting this displacement while the metal is in facial contact with the grid of the electrode which is to be charged with the spongy cadmium.

This and other objects of the invention will become more apparent from the following description and accompanying drawing of one embodiment of the inventive idea.

Figure 1:
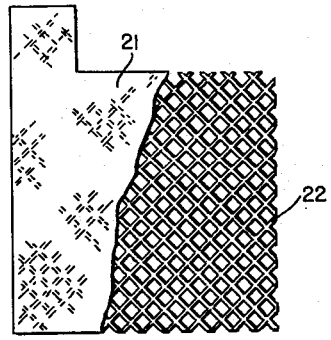
Fig. 1 is an elevational view of a single sponge-cadmium plate electrode with the cadmium partly removed from the supporting grid.
Figure 2:
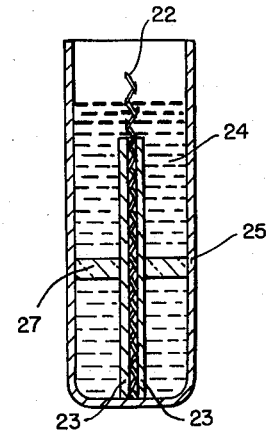
Fig 2 shows a lead grid sandwiched between zinc plates and immersed in a cadmium salt solution.

Referring to Figs. 1 and 2, the supporting grid 22 of lead or other suitable metal (silver, nickel, lead plated copper, etc.) is in facial contact, preferably on both sides, with plates 23 consisting of zinc, aluminum or any other metal of the electromotive series capable of displacing cadmium from

2 its solution. This structure of a grid 22 sandwiched between two metal plates 23 is immersed in an aqueous solution 24 of a cadmium salt (such as cadmium sulfate or cadmium chloride) which aqueous solution is contained in a vessel 25. Suitable means are provided to hold the sandwiched structure 22, 23 in place during the displacement reactions. Such means may, for instance, consist of pins 27 made of glass, rubber, cork or other inert materials. Suitable stirring and heating means (not shown) for the cadmium salt solution will be provided to accelerate the displacement reactions which start as soon as the sandwiched structure 22, 23 comes into contact with the cadmium solution 24. While the displacing metal, the zinc or the aluminum goes into solution it is replaced or superseded by cadmium metal of very spongy character. Since this sponge cadmium is in direct facial contact with the grid, the latter can be removed from the solution carrying the adherent spongy cadmium with it and this spongy cadmium is then lodged firmly into the grid openings by passing a roller over one or both surfaces of the lead grid.

Figure 3:
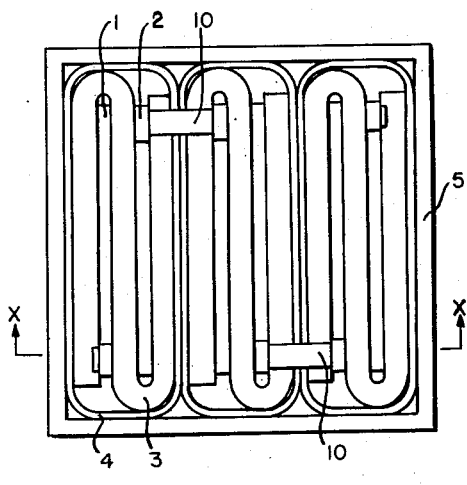
Fig. 3 is a top view of a battery consisting of three cadmium-lead-peroxide cells.
Figure 4:
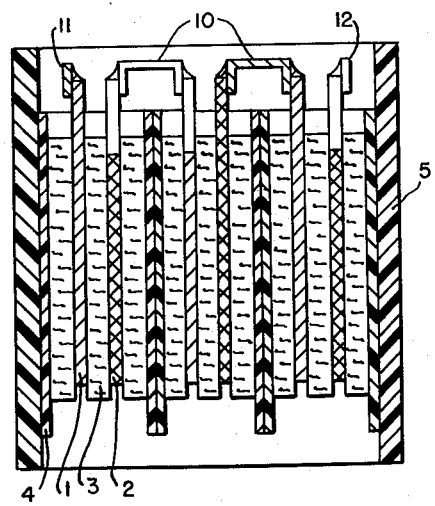
Fig. 4 is an enlarged sectional view taken along line X—X of Fig. 3.

The cadmium electrode thus produced is then washed to remove the forming solution and is finally air or oven dried. It may be used as electrode for primary or secondary batteries in various combinations, for instance, as negative electrode in a cadmium-lead peroxide "one-shot" battery as shown in Figs. 2 and 3, which battery consists of three cells each cell comprising a negative cadmium sponge electrode 1 made as described above and a positive lead peroxide electrode 2.

A spacer 3 of bibulous sheet material surrounds both electrodes laterally, thus separating the electrodes 1, 2 from each other and from the insulating sheet material which constitutes the hull 4 of the cell. This hull or cell container 4 holds the elements of the electrode-spacer structure laterally together under pressure contact but leaves top and bottom of the electrode-spacer structure open. The bibulous spacer 3 may consist of paper, wood-pulp, microporous rubber, glass wool or other liquid retaining materials, inert to the action of the acid electrolyte. The thickness of the spacer 3 is designed to soak up enough electrolyte (not shown) to allow complete utilization of the active material of the electrodes 1, 2.

The cell hull 4 consists of suitable plastic sheet material such as polystyrene, various poly-vinyl resins, synthetic rubber or other elastomers, Scotch tape, etc. A plurality of such cells in juxtaposition can be easily and tightly packaged, for instance, in an open frame structure or battery frame 5 which surrounds the cells and is of such inner dimensions that the desired number of cells are closely and immovably held together. The battery frame 5 may consist of any of the materials used for the cell hull 4 as enumerated above. Metal tabs 10 electrically connect successive cells in conventional manner; the positive electrode of one end cell and the negative electrode of the other end cell each being provided, respectively, with a positive terminal 11 and a negative terminal 12.

To activate the above-described battery, it is immersed partially into sulphuric acid or fluorboric acid electrolyte for about one to three minutes, depending on the size of the battery and the nature of the bibulous material of the spacers 3. After this time, the battery is withdrawn from the liquid electrolyte, shaken to remove excess liquid and is then ready for use.

The spongy cadmium electrodes made according to the present invention may also be used with other positive electrodes such as silver peroxide and mercuric oxide. If used with a nickel oxide electrode and an alkaline electrolyte the resulting cell will be rechargeable.

Various concentrations of cadmium salt solution may be used for the purpose of the present invention. I have found that an aqueous solution of cadmium sulfate containing 5% by weight of cadmium sulfate is especially preferable. The concentration of the cadmium salt solution will depend on several factors, e. g., the temperature of the aqueous solution, the metal used for displacing the cadmium, etc.

While the invention has been described in connection with a specific embodiment of a "one-shot" battery it is understood that other structures and also rechargeable batteries can be obtained by using a spongy cadmium electrode in combination with other electrodes and different electrolytes.

I claim:
1. A method of making sponge cadmium electrodes for primary and secondary batteries comprising putting a grid in facial contact with plates of a metal capable of displacing cadmium from a cadmium salt solution, immersing the structure consisting of said grid and said metal plates in an aqueous solution of a cadmium salt and withdrawing said grid from said solution after said metal plates have been replaced by sponge cadmium and pressing said sponge cadmium into the grid openings.

2. A method of making sponge cadmium electrodes according to claim 1 in which said grid is brought into facial contact with zinc plates.

3. A method of making sponge cadmium electrodes according to claim 1 in which said grid is brought into facial contact with aluminum plates.

4. A method of making sponge cadmium electrodes according to claim 1 in which the cadmium salt solution comprises cadmium sulfate.

5. A method of making sponge cadmium electrodes according to claim 1 in which the cadmium salt solution comprises cadmium chloride.

JOHN H. BALDWIN.

References Cited in the file of this patent

UNITED STATES PATENTS

| Number | Name | Date |
|---|---|---|
| 945,243 | Morrison | Jan. 4, 1910 |
| 1,537,731 | Basch | May 12, 1925 |
| 2,272,777 | Reuter | Feb. 10, 1942 |
| 2,422,045 | Ruben | June 10, 1947 |
| 2,448,052 | Roberts | Aug. 31, 1948 |

FOREIGN PATENTS

| Number | Country | Date |
|---|---|---|
| 6,829 | France | Jan. 17, 1907 |
| 480,109 | Great Britain | Feb. 15, 1938 |